June 2, 1936.　　　　F. C. TWIST　　　　2,042,915
CIRCUIT CLOSING DEVICE
Filed May 14, 1934
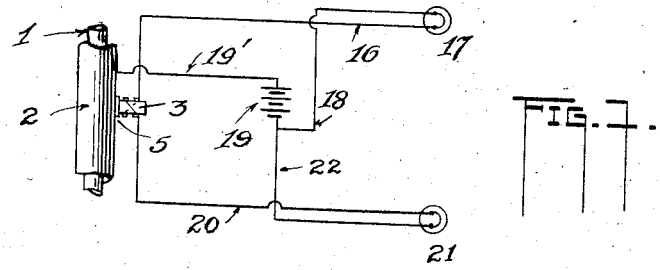
FIG. 1.
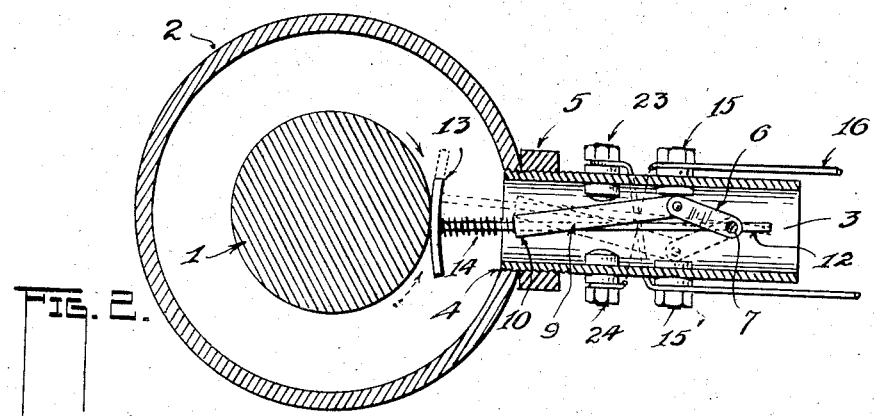
FIG. 2.
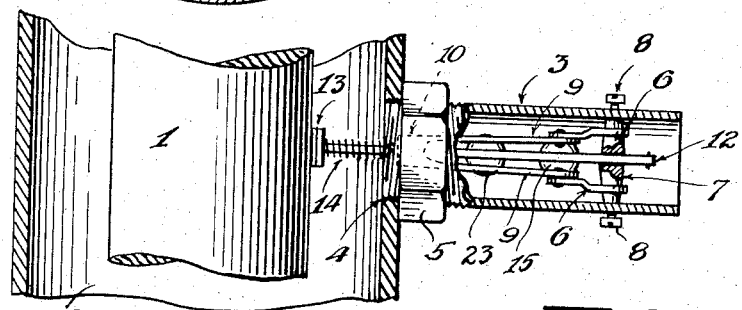
FIG. 3.
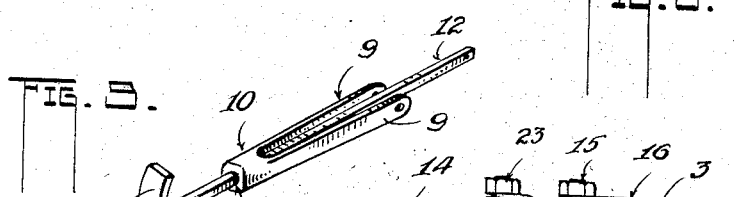
FIG. 4.
Inventor
F. C. Twist,
By L. M. Thurlow
Attorney Patented June 2, 1936

2,042,915

UNITED STATES PATENT OFFICE 2,042,915

CIRCUIT CLOSING DEVICE

Frederick C. Twist, near Weldon, Ill.

Application May 14, 1934, Serial No. 725,522

2 Claims. (Cl. 200—52)

This invention pertains to circuit closing devices for use particularly with signaling means for automobiles by which to automatically display a signal known to correspond with the direction in which the vehicle may be moving. More particularly the invention relates to means for automatically indicating at the rear of an automobile whether the latter is moving in a forward or rearward direction.

The main object of the invention is to automatically indicate a driver of a vehicle the direction in which a vehicle ahead of him may be moving as a safety measure.

Another object is to automatically indicate in which direction a standing vehicle is to move, such indication being apparent almost immediately such vehicle starts movement, so that persons in the rear thereof may govern themselves accordingly.

Still another object is that a vehicle can never start ahead nor move rearwardly without first and almost at once automatically showing the direction of travel contemplated by its driver.

To the end that my invention may be fully understood I have provided the appended drawing showing a preferred means of accomplishing the purpose of the invention, it being understood, however, that equivalent means may be used. In said drawing, Figure 1 is a diagram of a lighting circuit showing my invention in connection therewith.

Figure 2 is a transverse sectional elevation of the rear axle and axle-housing of an automobile showing my invention as used therewith, the latter being shown in longitudinal section.

Figure 3 is a longitudinal section of part of an axle-housing, and part of the axle of an automobile showing my invention in longitudinal section.

Figure 4 is a longitudinal section of part of a tubular member entering into the invention showing therewith a slightly different position of operating parts as compared with Figure 2, and Figure 5 shows in perspective certain associated parts illustrated in the earlier figures.

As a safety measure it is quite desirable, if not in fact necessary that persons in the rear of a vehicle be apprized of the direction of movement of such vehicle contemplated by the driver thereof. With this end in view I have devised the means by which this can be done automatically and with absolute certainty within but a few inches of movement of such vehicle.

In the drawing the rear axle and axle-housing of a vehicle are denoted by 1 and 2, respectively. A tubular member 3 is threaded at one end and screwed into an opening 4 made in the wall of the housing in such position that a line extending through the longest axis of the member will extend through the axis of the said axle whereby an operating stem of the device will have equal travel in either direction therewith, and preferably a lock-nut 5 serves to secure the member in fixed position with respect to said axle-housing.

Within the member 3 is mounted any suitable form of snap-switch arrangement by which to accomplish the purpose of the invention, an efficient type thereof being illustrated herein. It may comprise a pair of spaced links 6, for example, freely mounted at one of their ends and in this instance rock about a shaft 7 suitably journaled between the opposite walls of the member 3 as by screws 8, for example, there being pivoted to the opposite ends of the links 6 spaced arms 9 of a guide 10.

The end of the guide opposite its pivoted end lies near the threaded extremity of the member 3 and therefore nearest the axle 1 and has an opening 11 in that end through which a stem 12 is longitudinally slidable, one end thereof carrying an arcuate cross-head or shoe 13, its other end being slidable through the said shaft 7 as best shown in Figure 3, the curve of said shoe being part of a circle described from the axis of the said shaft 7, by preference, the outer face thereof abutting the axle 1 and adapted to roll thereupon, there being a spring 14 surrounding the stem between the shoe and the end of the guide 10 and under compression between the two whereby the said shoe is maintained in intimate frictional engagement with the said axle 1 to roll therewith in any reversal of rotation thereof, the stem 12 being preferably squared, for example, where it extends through the shaft 7 whereby to preserve the relation of the shoe 13 and axle 1 shown in Figure 2.

Mounted upon opposite walls of the member 3 are binding posts 15, 15' suitably insulated therefrom and each having a terminal portion within the bore of said member. A conductor 16 connects the post 15 with a lamp 17, the other side of the lamp being connected by a wire 18 with the battery 19 of the vehicle, for example, which in turn is grounded on the axle-housing or the vehicle frame, not shown, in a customary way by a conductor 19'. Likewise the post 15' by a conductor 20 is connected to a lamp 21 whose other side is connected with said battery 19 by conductor 22.

The guide 10 is free to rock within and with respect to the stem 12 due to the fact that the hole 11 is larger in diameter than said stem. For this reason, therefore, the said guide and links 6 may swing to two different positions without hindrance, these two positions being denoted in continuous and in dotted lines in Figure 2.

It is evident that since the spring 14 under compression between the shoe and guide will exert its force upon the latter endwise to the links 6 the toggle created by said guide and links will be influenced in snapping to either of the positions shown as the stem in swinging laterally passes beyond the point of pivotal connection of the named parts.

Mounted adjacent each of the posts 15, 15' is a post 23, 24, respectively, also insulated from the member 3 and each having an extension lying within the same, the extension as shown in Figure 2 being longer than those of said posts 15, 15' in that they extend further into the bore of the member than the others described. These posts are cross-connected with the posts 15, 15', see dotted lines, Figure 2, the post 23 being connected with the post 15' and the post 24 with the post 15.

In Figure 2 assume that the axle 1 is rotating clockwise as denoted by the arrow. It is seen that the shoe 13 lies in the position shown in continuous lines while the links 6 abut the post 15 and through the electrical connections described the lamp 17, of a red color to denote danger, will be lighted due to the fact that the vehicle is in the act of moving in a rearward direction. Now, also assume that the vehicle has been reversed in direction of travel, or moving forward, so that the axle 1 rotates contra-clockwise as viewed in the drawing. The shoe 13 now moves toward the dotted line position whereupon the arms 9 of the guide 10 and the links 6 strike the extension of the post 23, see Figure 4. This post acts as a fulcrum for the arms 9, the movement toward that post being arrested. But in the continued travel of the shoe the place of connection of the arms 9 and the links is moved in the opposite direction due to the fulcruming action, carrying such place of connection beyond the line of the stem 12 whereupon the toggle snaps toward the opposite side of the member to abut the post 15' as in dotted lines in Figure 2. This closes the circuit through the lamp 21, green in color for example, the red light having been extinguished. Depending, therefore, upon the direction of rotation of the axle one light or the other will be shown.

The posts 23 and 24 are cross-connected as a matter of preference, only, in that, for example, the instant the circuit through the lamp 17 is broken as the arms 9 are affected by the action just described, contact with and movement about the fulcrum at 23 results in the green light being shown followed by contact of the toggle with the post 15' in the same circuit. There is a like result, of course, in showing the red light in the opposite action of the parts.

I may not use this cross-connection of the posts but such an arrangement is preferable in that there is no flickering of the lights during changes in position of the toggle parts. Any other means may be used within the member 3 to act as fulcrums in place of the posts 23, 24. That is to say, whether in the nature of binding posts for conveying current or not, any inner extension will serve as a fulcrum to aid in obtaining the snap action of the parts.

In some of the claims I shall refer to the structure made up of the guide 10, the links 6 and the stem 12 as a switch or snap-switch.

The stem 12 may be of such length, of course, that the shoe will reach and have proper pressure against the axle no matter how far the wall 10 of the axle-housing may be from the axle.

Obviously, the device may be used either with a rotary part such as the axle 1 or with a reciprocating part such as a gear-shift lever or other part whose reversal in position will result in a change from a green light to a red light or vice versa.

I claim:

1. The combination with the rear axle of a motor vehicle, of a member supported at right angles to said axle having two walls one lying opposite the other, a toggle structure mounted in the member, electrically connected to the same, and including a stem having a shoe in frictional engagement with the axle and swung by such engagement, means to urge the stem endwise toward said axle, an electrical terminal on each of two opposite walls of the member adapted to alternately receive contact of the toggle during the swing of the same in opposite directions of rotation of the rotatable member, and an electrical terminal adjacent each of the first named terminals between the same and the end of the tubular member lying nearest the said axle, the second named terminals being each adapted to receive initial contact of the toggle in its movement and each having separate electrical connection with an opposite terminal of the first named terminals.

2. The combination with a rotatable member, of a tubular member supported adjacent the same with the axis of its bore lying substantially at right angles to the axis of rotation thereof, a toggle structure electrically connected to the said tubular member including a stem movable endwise and pivotally supported on the latter adapted to swing laterally at one end and provided at that end with a shoe to engage the rotatable member, a link pivoted at one end within the tubular member substantially at the place of pivotal mounting of the stem, an arm pivoted at one end to the other end of the link and at its other end slidably receiving the stem, elastic means interposed between that end of the arm and the shoe adapted to hold the latter in engagement with the rotatable member and to normally maintain the pivotally connected ends of the link and arm swung laterally out of line with the stem, and an electrical terminal fixed to and insulated from each of two opposite walls of the tubular member in positions to alternately receive contact of the said pivotally connected ends of said link and arm in and during opposite directions of movement of the rotatable member, and an electrical terminal adjacent each of the first named terminals between the same and the end of the tubular member lying nearest the said rotatable member and each in position to receive contact of the arm in the swing thereof, the second described terminals being separately connected electrically with opposite terminals of the said first named terminals.

FREDERICK C. TWIST.